United States Patent
Sugiyama et al.

(10) Patent No.: US 9,751,806 B2
(45) Date of Patent: Sep. 5, 2017

(54) HIGH ZIRCONIA ELECTRICALLY FUSED CAST REFRACTORY

(71) Applicant: SAINT-GOBAIN TM K.K., Tokyo (JP)

(72) Inventors: Hiroshi Sugiyama, Tokyo (JP); Toshimitsu Kuboki, Tokyo (JP); Itaru Hashimoto, Tokyo (JP); Yasuo Misu, Tokyo (JP)

(73) Assignee: SAINT-GOBAIN TM K.K., Tokyo (JP)

( * ) Notice: Subject to any disclaimer, the term of this patent is extended or adjusted under 35 U.S.C. 154(b) by 0 days.

(21) Appl. No.: 15/121,682

(22) PCT Filed: Mar. 2, 2015

(86) PCT No.: PCT/JP2015/056759
§ 371 (c)(1),
(2) Date: Aug. 25, 2016

(87) PCT Pub. No.: WO2016/125317
PCT Pub. Date: Aug. 11, 2016

(65) Prior Publication Data
US 2016/0362342 A1 Dec. 15, 2016

(30) Foreign Application Priority Data
Feb. 2, 2015 (JP) .................................. 2015-018424

(51) Int. Cl.
*C04B 35/484* (2006.01)
*C03B 5/43* (2006.01)
*C03B 5/02* (2006.01)

(52) U.S. Cl.
CPC .............. *C04B 35/484* (2013.01); *C03B 5/43* (2013.01); *C03B 5/02* (2013.01);
(Continued)

(58) Field of Classification Search
CPC .................................. C04B 35/484; C03B 5/43
See application file for complete search history.

(56) References Cited

U.S. PATENT DOCUMENTS 6,158,248 A * 12/2000 Beppu ....................... C03B 5/43
264/636
8,268,742 B2 * 9/2012 Sato ........................... C03B 5/43
501/104
(Continued)

FOREIGN PATENT DOCUMENTS

JP S63-285173 A 11/1988
JP H04-193766 A 7/1992
(Continued)

OTHER PUBLICATIONS

International Search Report (ISR) dated Mar. 13, 2015, for PCT/JP2015/056759.

*Primary Examiner* — Karl Group
(74) *Attorney, Agent, or Firm* — Bacon & Thomas, PLLC (57) ABSTRACT

A high zirconia electrically fused cast refractory of high electric resistance having long time durability, less suffering from cracking during production and upon temperature rising, excellent in productivity, less forming zircon crystals even upon heating the refractory in itself and when the refractory is in contact with molten glass, generating less cracks even when undergoing heat cycles during operation of a glass melting furnace is provided. A high zirconia electrically fused cast refractory has, as chemical components, 85 to 95% by weight of $ZrO_2$, 0.1 to less than 0.8% by weight of $Al_2O_3$, 3.5 to 10.0% by weight of $SiO_2$, less than 0.05% by weight of $Na_2O$ and $K_2O$ in total, 0.1 to 1.5% by weight of $B_2O_3$, 0.1% by weight or less of MgO, 0.01 to 0.2% by weight of CaO, in the case where any one of BaO and SrO is contained, from 0.05 to 3.0% by weight of BaO or 0.01 to 3.0% by weight of SrO, or in the case where both
(Continued)

of them are contained, 0.01% by weight or more of SrO and from 0.01% to 3.0% by weight in total of SrO and BaO, 0.1 to 0.7% by weight of $SnO_2$, 0.3% by weight or less of $Fe_2O_3$ and $TiO_2$ in total, less than 0.01% by weight of $P_2O_5$, and less than 0.01% by weight of CuO.

13 Claims, 1 Drawing Sheet

(52) U.S. Cl.
CPC .......... *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3225* (2013.01); *C04B 2235/3244* (2013.01); *C04B 2235/3272* (2013.01); *C04B 2235/3281* (2013.01); *C04B 2235/3293* (2013.01); *C04B 2235/34* (2013.01); *C04B 2235/3409* (2013.01); *C04B 2235/3418* (2013.01); *C04B 2235/72* (2013.01); *C04B 2235/727* (2013.01); *C04B 2235/9607* (2013.01); *C04B 2235/9669* (2013.01)

(56) References Cited

U.S. PATENT DOCUMENTS

| | | | | |
|---|---|---|---|---|
| 8,563,454 | B2* | 10/2013 | Gaubil | C03B 5/43 |
| | | | | 501/105 |
| 9,475,735 | B2* | 10/2016 | Kuboki | C03B 5/43 |
| 2009/0176642 | A1 | 7/2009 | Tomura et al. | |
| 2012/0036895 | A1 | 2/2012 | Sato | |
| 2016/0023955 | A1* | 1/2016 | Kuboki | C03B 5/43 |
| | | | | 501/104 |

FOREIGN PATENT DOCUMENTS

| | | | |
|---|---|---|---|
| JP | 9-2870 | * | 1/1997 |
| JP | H09-2870 A | | 1/1997 |
| JP | 2003-026475 A | | 1/2003 |
| JP | 2008-007358 A | | 1/2008 |
| WO | 2005/068393 A1 | | 7/2005 |

* cited by examiner

HIGH ZIRCONIA ELECTRICALLY FUSED CAST REFRACTORY

BACKGROUND OF THE INVENTION

Field of the Invention

The present invention relates to a high zirconia electrically fused cast refractory of high electric resistance which is excellent in heat cycle stability, less forms zircon crystals when used for glass melting furnaces, and can be used stably for a long time.

Statement of the Related Art

The electrically fused cast refractory (sometimes simply referred to also as refractory) has been used frequently as a refractory for use in glass melting furnaces.

The electrically fused cast refractory is a refractory which is dense and has excellent corrosion resistance to molten glass, and produced by melting a starting material formed by mixing main components such as alumina, silica and zirconia and minor components such as sodium compounds and boric acid in predetermined amounts in an electric furnace, casting the molten product in a refractory mold, cooling the product in an annealing material, and solidifying the same into the shape of the mold.

For example, a high zirconia electrically fused cast refractory containing 80% by weight or more of $ZrO_2$ is used for such an electrically fused cast refractory.

Since the high zirconia electrically fused cast refractory has a high $ZrO_2$ content and a dense texture, the refractory has high corrosion resistance to all kinds of molten glass.

Further, since the high zirconia electrically fused cast refractory has a property of not forming a reaction layer at a boundary with the molten glass, it is excellent in that defects such as stones or cords are less formed in the molten glass.

Accordingly, the high zirconia electrically fused cast refractory is particularly suitable to produce of high quality glass.

In the mineral structure of the high zirconia electrically fused cast refractory, a most portion thereof comprises monoclinic zirconia crystals in which a small amount of a glass phase fills the grain boundaries of the zirconia crystals.

Generally, the glass phase of the high zirconia electrically fused cast refractory comprises oxides such as $Al_2O_3$, $SiO_2$, $Na_2O$, $B_2O_3$, and $P_2O_5$.

On the other hand, zirconia crystals of the refractory transform reversibly between a monoclinic system and a tetragonal system accompanying abrupt volume change at a temperature near 1000° C. (upon temperature lowering) to 1150° C. (upon temperature rising).

A high zirconia electrically fused cast refractory with no cracks during production and upon temperature rising can be produced at a level of actual production by moderating a stress generated by the volume change accompanying the transformation of the zirconia crystals by the flow of the glass phase that fills the zirconia crystal grain boundaries.

Further, when the high zirconia electrically fused cast refractory undergoes heating or heat cycles, silica ($SiO_2$) and zirconia ($ZrO_2$) crystals as main components of the glass phase sometimes react to form zircon ($ZrO_2.SiO_2$) crystals.

In this case since the zircon crystals are formed in the glass phase, formation of the zircon crystals relatively decreases the glass phase. Further, as the glass phase decreases due to growing or increase of the zircon crystals, abrupt volume change of the zirconia crystals at a temperature near 1000° C. to 1150° C. becomes less absorbed.

As a result, when the zircon crystals increase exceeding a certain level, a residual volume expansion of the refractory in itself increases extremely to sometimes generate cracks due to deterioration of the strength of the refractory structure, and finally suffer from pulverization.

Accordingly, a high zirconia electrically fused cast refractory that less forms zircon crystals and is stable against heat cycles has been demanded (first subject).

Further, even a high zirconia electrically fused cast refractory which less causes zircon crystals for the refractory in itself by heating or heat cycles, tends to form zircon crystals under the condition where the refractory is in contact with molten glass. Particularly, when the high zirconia electrically fused cast refractory is used for a glass melting furnace for melting non-alkali glass such as liquid crystal display (LCD) panel glass (which may be hereinafter referred to as liquid crystal glass), zircon crystals often tend to be formed.

The zircon crystals are formed upon melting of the glass due to difference of the concentration of the constituent components between the molten glass and the glass phase of the high zirconia electrically fused cast refractory by substitution of the respective components each other.

That is, components that suppress the formation of the zircon crystals in the high zirconia electrically fused cast refractory diffuse into the molten glass. Conversely, components tending to form the zircon crystals intrude from the molten glass into the refractory. It is considered that the formation of the zircon crystals in the high zirconia electrically fused cast refractory is promoted by one or both of the reasons described above.

In a state where the zircon crystals are formed in the high zirconia electrically fused cast refractory used for the glass melting furnace to decrease the amount of the glass phase, abrupt volume change of the zirconia crystals is difficult to be absorbed at a temperature near 1000° C. to 1150° C.

As a result, when the refractory undergoes heating during operation and heat cycles due to the change of operation temperature, the residual volume expansion of the refractory in itself increases extremely, by which the strength of the structure is lowered tending to generate cracks in the refractory. The refractory is eroded selectively from the cracked portion. When erosion proceeds further, pieces of refractory intrude into the molten glass to sometimes deteriorate the quality of the glass.

On the other hand, when a high zirconia electrically fused cast refractory that less forms the zircon crystals even in contact with the molten glass is used as the furnace material, the zircon crystals are less formed and the refractory remains stable even when undergoing heating during operation of the glass melting furnace and the heat cycles due to change of the operation temperature, and cracks are less formed. Further, upon temperature lowering when the production of the glass melting furnace is interrupted, occurrence of new cracks and growing of already formed cracks can be suppressed.

Accordingly, upon re-operation after interruption of the operation, the high zirconia electrically fused cast refractory can be used again without replacing the refractory.

As described above, a high zirconia electrically fused cast refractory that less forms the zircon crystals even under the condition in contact with the molten glass has been required (second subject).

Further, for the non-alkali glass such as liquid crystal display glass (LCD), glass of a composition having higher electric resistance than usual is used for improving the property.

Accordingly, a product of high electric resistance has been required also for the high zirconia electrically fused cast refractory as the material for the glass melting furnace (third subject).

The glass phase of the high zirconia electrically fused cast refractory comprises oxides such as $Al_2O_3$, $SiO_2$, $Na_2O$, $B_2O_3$, and $P_2O_5$ as described above.

However, while the amount of the glass phase in the refractory is small, the property of the refractory undergoes a significant effect depending on the kind and the amount of the components that form the glass phase.

That is, it has been known that while alkali metal oxides such as $Na_2O$ in the oxides suppress the formation of the zircon crystals upon heating of the refractory in itself, cracks tend to occur during production of the refractory or upon temperature rising of the glass melting furnace constructed with the refractory, which significantly lowers the electric resistance of the refractory.

On the other hand, since oxides such as $B_2O_3$ and $P_2O_5$ provide an effect of preventing cracks during production of the refractory and cracks upon temperature rising of the glass melting furnace constructed with the refractory, they are often used together with the oxides such as $Na_2O$. However, such oxides promote the formation of the zircon crystals contrary to $Na_2O$. Particularly, since $P_2O_5$ has a remarkable trend, it should be used carefully.

Accordingly, a refractory comprising a glass phase having low content of alkali metal oxides (for example, less than 0.05% by weight) and relatively high content of $B_2O_3$ has relatively high electric resistance, generate less cracks during production and upon temperature rising, so that stable start-up for operation is possible.

However, zircon crystals tend to be formed upon heating the refractory in itself and, particularly, under the condition in contact with the molten glass. Accordingly, since generation of cracks and corrosion proceed during operation of the glass melting furnace, there is a subject that the stable operation for a long time is not possible and the refractory cannot be used again upon re-operation after interruption of the operation.

The present invention relates to a high zirconia electrically fused cast refractory of high electric resistance comprising a glass phase having a low content of alkali metal oxides such as $Na_2O$ and a relatively high content of $B_2O_3$.

High zirconia electrically fused cast refractories of high electric resistance and less forming the zircon crystals have been studied so far.

JP-A S63(1988)-285173 discloses a high zirconia electrically fused cast refractory of high electric resistance containing 90 to 98% of $ZrO_2$ and 1% or less of $Al_2O_3$, not substantially containing any $Li_2O$, $Na_2O$, CaO, Cud, and MgO, containing 0.5 to 1.5% of $B_2O_3$ or containing 0.5 to 1.5% of $B_2O_3$, and containing 1.5% by weight or less of one or more of $K_2O$, SrO, BaO, $Rb_2O$, and $Cs_2O$.

However, the refractory described in JP-A S63(1988)-285173 has high electric resistance but involves a drawback of having a large residual expansion after a heat cycle test and tending to form zircon crystals for the refractory in itself. Further, it was insufficient to suppress the formation of the zircon crystals also under the condition in contact with the molten glass. Further, the refractory does not contain CaO that controls the viscosity of the glass phase and stabilizes the glass phase and cannot moderate the stress generated during production to generate cracks in a one-side heating test to be described later.

JP-A H04(1992)-193766 proposes a high zirconia electrically fused cast refractory of high electric resistance containing 85 to 95.5% by weight of $ZrO_2$, 3.5 to 10% by weight of $SiO_2$, 1 to 3% by weight of $Al_2O_3$, 0 to 1.5% by weight of $B_2O_3$, 0.3 to 3% by weight of BaO, SrO, and CaO in total, 0 to 1.5% by weight of ZnO and not substantially containing $Na_2O$ and $K_2O$ (less than 0.01% by weight).

JP-A H04-193766 disclosed a refractory not substantially containing alkali metal oxides such as $Na_2O$ and $K_2O$, containing alkaline earth metal oxides such as CaO, BaO, and SrO, having high electric resistance, showing small residual expansion even after repeating heat cycles passing through the transformation temperature of the zirconia crystals, and suppressing the formation of the zircon crystals. Further, the reference describes that ZnO has an effect of decreasing the viscosity of a matrix glass in a predetermined temperature region without increasing the rate of heat expansion of the matrix glass.

However, since the refractory has a high $Al_2O_3$ content, electric resistance was insufficient.

Further, suppression of the formation of the zircon crystals was insufficient upon heating the refractory in itself and under the condition where the refractory is in contact with the molten glass.

JP-A H09(1997)-2870 proposes a high zirconia electrically fused cast refractory with less cracks during production and cracks due to heat cycles, containing 89 to 96% by weight of $zrO_2$, 2.5 to 8.5% by weight of $SiO_2$, 0.2 to 1.5% by weight of $Al_2O_3$, less than 0.5% of $P_2O_5$, less than 1.2% by weight of $B_2O_3$, less than 0.3% by weight of CuO, more than 0.01 and less than 1.7% by weight of $P_2O_5+B_2O_3$, 0.05 to 1.0% by weight of $Na_2O+K_2O$, 0.01 to 0.5% by weight of BaO, less than 0.5% by weight of $SnO_2$, and less than 0.3% by weight of $Fe_2O_3+TiO_2$.

In JP-A H09(1997)-2870, since the content of $Na_2O$ and $K_2O$ is high, the electric resistance was insufficient.

Further, this reference describes that formation of the zircon crystals can be suppressed by adding $Na_2O$, $K_2O$, and BaO even when $P_2O_5$ and $B_2O_3$ that promote formation of the zircon crystals are contained. However, while BaO that suppresses the formation of the zircon crystals is contained, since $P_2O_5$ that remarkably promotes the formation of the zircon crystals is contained, suppression of the formation of the zircon crystals was not sufficient upon heating the refractory in itself. Further, $Na_2O$ and $K_2O$ that suppress the formation of the zircon crystals tend to diffuse to the molten glass under the condition where the refractory is in contact with the molten glass, suppression of the formation of the zircon crystals was not sufficient.

Further, $SnO_2$ is not an essential component and the effect of $SnO_2$ against cracking during production of the refractory or cracking after the heat cycle is not described at all, and the effect of adding $SnO_2$ is not apparent.

JP-A 2008-7358 proposes a high zirconia electrically fused cast refractory of high electric resistance excellent in a heat cycle stability comprising 87 to 96% by weight of $ZrO_2$, 0.1 to less than 0.8% by weight of $Al_2O_3$, 3 to 10% by weight or less of $SiO_2$, less than 0.05% by weight of $Na_2O$, 0.01 to 0.2% by weight of $K_2O$, 0.1 to 1.0 by weight of $B_2O_3$, 0.1 to 0.5% by weight of BaO, less than 0.05% by weight of SrO, 0.01 to 0.15% by weight of CaO, 0.05 to 0.4% by weight of $Y_2O_3$, 0.1% by weight or less of MgO, 0.3% by weight or less of $Fe_2O_3+TiO_2$, and less than 0.01% by weight of $P_2O_5$ and CuO.

However, even within the range described above, if the total amount of $Na_2O$ and $K_2O$ is more than 0.05% by weight, the electric resistance was insufficient. Further, while the refractory contains SrO and BaO which are the components that suppress the formation of the zircon crystals and an effect of suppressing formation of the zircon crystals is obtained upon heating the refractory in itself. However since $Na_2O$, $K_2O$, BaO and SrO that suppress the formation of the zircon crystals tend to diffuse into the molten glass under the condition in contact with the molten glass, suppression of the formation of the zircon crystals was not sufficient.

WO2005/068393A1 proposes a high zirconia electrically fused cast refractory of high electric resistance containing 0.8 to 2.5% by weight of $Al_2O_3$, 4.0 to 10.0% by weight of $SiO_2$, 86 to 95% by weight of $ZrO_2$, 0.1 to 1.2% by weight of $B_2O_3$, 0.04% by weight or less of $Na_2O$, 0.4% by weight or less of CaO, 0.1% by weight or less of $Fe_2O_3$, and 0.25% by weight or less of $TiO_2$.

Since the refractory has a high $Al_2O_3$ content, electric resistance was not sufficient in case of exceeding 1% by weight of $Al_2O_3$. Further, CaO content exceeding 0.2% by weight is not preferred, since this lowers the electric resistance and promotes the formation of the zircon crystals.

Further, when the content of each of the components described in the examples of this reference are investigated closely, the refractory does not contain $K_2O$, SrO and BaO having an effect of suppressing the formation of the zircon crystals, and suppression for the zircon crystals is not sufficient upon heating the refractory in itself and under the condition in contact with the molten glass.

As described above, in the existent high zirconia electrically fused cast refractories of high electric resistance, suppression of the formation of the zircon crystals are described upon heating the refractory in itself, but formation of the zircon crystals under the condition where the refractory is in contact with the molten glass which is close to the operation condition of the glass melting furnace are not described. Therefore high zirconia electrically fused cast refractory of high electric resistance and suppression of the formation of the zircon crystals was needed.

SUMMARY OF THE INVENTION

The present invention intends to provide a high zirconia electrically fused cast refractory of high electric resistance having long time durability that less forms zircon crystals even upon heating the refractory in itself and under the condition where the refractory is in contact with molten glass and causes less cracks even when undergoing heat cycles during operation of a glass melting furnace.

For solving the subject, the present invention provides, in a first aspect, a high zirconia electrically fused cast refractory comprising: 85 to 95% by weight of $ZrO_2$, 0.1 to less than 1.0% by weight of $Al_2O_3$, 3.5 to 10.0% by weight of $SiO_2$, less than 0.05% by weight of $Na_2O$ and $K_2O$ in total, 0.1 to 1.5% by weight of $B_2O_3$, 0.1% by weight or less of MgO, 0.01 to 0.2% by weight of CaO, in the case where any one of BaO and SrO is contained, 0.05 to 3.0% by weight of BaO or 0.01 to 3.0% by weight SrO, or in the case where both of them are contained, 0.01% by weight or more of SrO and 0.01 to 3.0% by weight of SrO and BaO in total, 0.01 to 0.7% by weight of $SnO_2$, 0.3% by weight or less of $Fe_2O_3$ and $TiO_2$ in total, less than 0.01% by weight of $P_2O_5$, and less than 0.01% by weight of CuO.

The present invention further provides, in a second aspect, a high zirconia electrically fused cast refractory comprising: 85 to 95% by weight of $ZrO_2$, 0.1 to less than 0.8% by weight of $Al_2O_3$, 3.5 to 10.0% by weight of $SiO_2$, less than 0.05% by weight of $Na_2O$ and $K_2O$ in total, 0.1 to 1.5% by weight of $B_2O_3$, 0.1% by weight or less of MgO, 0.01 to 0.2% by weight of CaO, in the case where any one of BaO and SrO is contained, from 0.05 to 3.0% by weight of BaO or 0.01 to 3.0% by weight of SrO, or in the case where both of them are contained, 0.01% by weight or more of SrO and from 0.01% to 3.0% by weight in total of SrO and BaO, 0.1 to 0.7% by weight of $SnO_2$, 0.3% by weight or less of $Fe_2O_3$ and $TiO_2$ in total, less than 0.01% by weight of $P_2O_5$, and less than 0.01% by weight of CuO.

The present invention further provides, in a third aspect, a high zirconia electrically fused cast refractory comprising: 85 to 95% by weight of $ZrO_2$, 0.1 to less than 0.8% by weight of $Al_2O_3$, 3.5 to 10.0% by weight of $SiO_2$, less than 0.05% by weight of $Na_2O$ and $K_2O$ in total, 0.1 to 1.5% by weight of $B_2O_3$, 0.1% by weight or less of MgO, 0.01 to 0.2% by weight of CaO, in the case where any one of BaO and SrO is contained, from 0.05 to 1.5% by weight of BaO or 0.01 to 1.5% by weight of SrO, or in the case where both of them are contained, 0.01% by weight or more of SrO and from 0.01% to 1.5% by weight in total of SrO and BaO, 0.1 to 0.7% by weight of $SnO_2$, 0.3% by weight or less of $Fe_2O_3$ and $TiO_2$ in total, less than 0.01% by weight of $P_2O_5$, and less than 0.01% by weight of CuO.

The present invention further provides, in a fourth aspect, a high zirconia electrically fused cast refractory comprising: 85 to 95% by weight of $ZrO_2$, 0.1 to less than 0.8% by weight of $Al_2O_3$, 4.0 to 9.5% by weight of $SiO_2$, less than 0.04% by weight of $Na_2O$ and $K_2O$ in total, 0.2 to 1.0% by weight of $B_2O_3$, 0.1% by weight or less of MgO, 0.01 to 0.15% by weight of CaO, in the case where any one of BaO and SrO is contained, from 0.05 to 1.0% by weight of BaO or 0.01 to 1.0% by weight of SrO, or in the case where both of them are contained, 0.01% by weight or more of SrO and from 0.01% to 1.0% by weight in total of SrO and BaO, 0.1 to 0.5% by weight of $SnO_2$, 0.3% by weight or less of $Fe_2O_3$ and $TiO_2$ in total, less than 0.01% by weight of $P_2O_5$, and less than 0.01% by weight of CuO.

The present invention further provides, in a fifth aspect, a high zirconia electrically fused cast refractory comprising: 85 to 95% by weight of $ZrO_2$, 0.1 to less than 0.8% by weight of $Al_2O_3$, 4.0 to 9.5% by weight of $SiO_2$, less than 0.04% by weight of $Na_2O$ and $K_2O$ in total, 0.2 to 1.0% by weight of $B_2O_3$, 0.1% by weight or less of MgO, 0.01 to 0.15% by weight of CaO, in the case where any one of BaO and SrO is contained, more than 0.5% to 1.0% by weight of BaO or 0.2 to 1.0% by weight of SrO, or in the case where both of them are contained, 0.2% by weight or more of SrO and from 0.2% to 1.0% by weight in total of SrO and BaO, 0.1 to 0.5% by weight of $SnO_2$, 0.3% by weight or less of $Fe_2O_3$ and $TiO_2$ in total, less than 0.01% by weight of $P_2O_5$, and less than 0.01% by weight of CuO.

In a preferred embodiment of the high zirconia electrically fused cast refractory according to any one of the first to fifth aspects of the invention described above, the residual volume expansion after repetitive heating for 20 cycles is 10% or less assuming the process of increasing the temperature up to 1450° C. after keeping at 600° C. for one hour and then keeping at 1450° C. for one hour being as one cycle.

In a preferred embodiment of the high zirconia electrically fused cast refractory according to any one of the first to fifth aspects of the invention described above, a residual volume expansion is 15% or less after filling liquid crystal glass in a crucible made of a high zirconia electrically fused cast refractory, and applying repetitive heating for 10 cycles assuming a process of rising the temperature up to 1450° C. after keeping at 800° C. for 3 hours and then keeping at 1450° C. for 3 hours being as one cycle.

In a preferred embodiment of the high zirconia electrically fused cast refractory according to any one of the first to fifth aspects of the invention described above, a residual volume expansion is 10% or less after filling liquid crystal glass in a crucible made of a high zirconia electrically fused cast refractory, and applying repetitive heating for 10 cycles assuming a process of rising the temperature up to 1450° C. after keeping at 800° C. for 3 hours and then keeping at 1450° C. for 3 hours being as one cycle.

In a preferred embodiment of the high zirconia electrically fused cast refractory according to any one of the first to fifth aspects of the invention described above, the electric resistance at 1500° C. is 150 Ω·cm or higher.

In a preferred embodiment of the high zirconia electrically fused cast refractory according to any one of the first to fifth aspects of the invention described above, the electric resistance at 1500° C. is 200 Ω·cm or higher.

In a preferred embodiment of the high zirconia electrically fused cast refractory according to the first to fifth aspects of the invention described above, the electric resistance after heating at 1650° C. for 12 hours is 90 Ω·cm or higher.

In a preferred embodiment of the high zirconia electrically fused cast refractory according to the first to fifth aspects of the invention described above, the electric resistance after heating at 1650° C. for 12 hours is 150 Ω·cm or higher.

In a preferred embodiment of a high zirconia electrically fused cast refractory according to any one of the first to fifth aspects of the invention which is used for a glass melting furnace.

The high zirconia electrically fused cast refractory of the invention provides properties of having high electric resistance, not suffering from cracks during production and upon temperature rising and less forming zircon crystals both for the state of refractory in itself and under the condition where the refractory is in contact with the molten glass.

When the high zirconia electrically fused cast refractory of high electric resistance of the invention is used for the electric melting glass furnace, since the refractory has a high electric resistance, glass can be melted efficiently.

Further, since the zircon crystals are less formed in the refractory, generation and development of cracks less occur during operation, long time operation is possible also including re-operation, the refractory of the invention is extremely advantageous industrially.

When the high zirconia electrically fused cast refractory of the invention is used for the glass melting furnace, since the quality of the glass product is not deteriorated and cracks or pulverization of the refractory less occur even after interrupting the operation of the glass melting furnace, the refractory can be used again without replacement.

BRIEF DESCRIPTION OF THE DRAWINGS

Examples of the present invention will be described in detail based on the following FIGURE, wherein.

DETAILED DESCRIPTION OF THE PREFERRED EMBODIMENTS

As a result of an earnest study made by the present inventors, there can be provided a high zirconia electrically fused cast refractory with higher electric resistance at high temperature and zircon crystals are less formed even upon heating a refractory in itself or heating under the condition where the refractory is in contact with a molten glass by defining the chemical components of the high zirconia electrically fused cast refractory as: 85 to 95% by weight of $ZrO_2$, 0.1 to less than 1.0% by weight of $Al_2O_3$, 3.5 to 10.0% by weight of $SiO_2$, less than 0.05% by weight of $Na_2O$ and $K_2O$ in total, 0.1 to 1.5% by weight of $B_2O_3$, 0.1% by weight or less of MgO, 0.01 to 0.2% by weight of CaO, in the case where any one of BaO and SrO is contained, 0.05 to 3.0% by weight of BaO or 0.01 to 3.0% by weight SrO, or in the case where both of them are contained, 0.01% by weight or more of SrO and 0.01 to 3.0% by weight of SrO and BaO in total, 0.01 to 0.7% by weight of $SnO_2$, 0.3% by weight or less of $Fe_2O_3$ and $TiO_2$ in total, less than 0.01% by weight of $P_2O_5$, and less than 0.01% by weight of CuO.

preferably, there can be provided a high zirconia electrically fused cast refractory with higher electric resistance at high temperature and zircon crystals are less formed even by heating the refractory in itself or by heating under the condition where the refractory is in contact with the molten glass by defining the chemical ingredient as: 85 to 95% by weight of $ZrO_2$, 0.1 to less than 0.8% by weight of $Al_2O_3$, 3.5 to 10.0% by weight of $SiO_2$, less than 0.05% by weight of $Na_2O$ and $K_2O$ in total, 0.1 to 1.5% by weight of $B_2O_3$, 0.1% by weight or less of MgO, 0.01 to 0.2% by weight of CaO, in the case where any one of BaO and SrO is contained, from 0.05 to 3.0% by weight of BaO or 0.01 to 3.0% by weight of SrO, or in the case where both of them are contained, 0.01% by weight or more of SrO and 0.01% to 3.0% by weight in total of SrO and BaO, 0.1 to 0.7% by weight of $SnO_2$, 0.3% by weight or less of $Fe_2O_3$ and $TiO_2$ in total, less than 0.01% by weight of $P_2O_5$, and less than 0.01% by weight of CuO.

More preferably, there can be provided a high zirconia electrically fused cast refractory with higher electric resistance at high temperature and zircon crystals are less formed even by heating the refractory in itself or by heating under the condition where the refractory is in contact with the molten glass by defining the chemical ingredient as: 85 to 95% by weight of $ZrO_2$, 0.1 to less than 0.8% by weight of $Al_2O_3$, 3.5 to 10.0% by weight of $SiO_2$, less than 0.05% by weight of $Na_2O$ and $K_2O$ in total, 0.1 to 1.5% by weight of $B_2O_3$, 0.1% by weight or less of MgO, 0.01 to 0.2% by weight of CaO, in the case where any one of BaO and SrO is contained, from 0.05 to 1.5% by weight of BaO or 0.01 to 1.5% by weight of SrO, or in the case where both of them are contained, 0.01% by weight or more of SrO and from 0.01% to 1.5% by weight in total of SrO and BaO, 0.1 to 0.7% by weight of $SnO_2$, 0.3% by weight or less of $Fe_2O_3$ and $TiO_2$ in total, less than 0.01% by weight of $P_2O_5$, and less than 0.01% by weight of CuO.

Further preferably, there can be provided a high zirconia electrically fused cast refractory with higher electric resistance at high temperature and zircon crystals are less formed even by heating the refractory in itself or by heating under the condition where the refractory is in contact with the molten glass by defining the chemical ingredient as:

85 to 95% by weight of $ZrO_2$, 0.1 to less than 0.8% by weight of $Al_2O_3$, 4.0 to 9.5% by weight of $SiO_2$, less than 0.04% by weight of $Na_2O$ and $K_2O$ in total, 0.2 to 1.0% by weight of $B_2O_3$, 0.1% by weight or less of MgO, 0.01 to 0.15% by weight of CaO, in the case where any one of BaO and SrO is contained, from 0.05 to 1.0% by weight of BaO or 0.01% to 1.0% by weight of SrO, or in the case where both of them are contained, 0.01% by weight or more of SrO and from 0.01% to 1.0% by weight in total of SrO and BaO, 0.1 to 0.5% by weight of $SnO_2$, 0.3% by weight or less of $Fe_2O_3$ and $TiO_2$ in total, less than 0.01% by weight of $P_2O_5$, and less than 0.01% by weight of CuO.

Particularly preferably, there can be provided a high zirconia electrically fused cast refractory with higher electric resistance at high temperature and zircon crystals are less formed even by heating the refractory in itself or by heating under the condition where the refractory is in contact with the molten glass by defining the chemical ingredient as: 85 to 95% by weight of $ZrO_2$, 0.1 to less than 0.8% by weight of $Al_2O_3$, 4.0 to 9.5% by weight of $SiO_2$, less than 0.04% by weight of $Na_2O$ and $K_2O$ in total, 0.2 to 1.0% by weight of $B_2O_3$, 0.1% by weight or less of MgO, 0.01 to 0.15% by weight of CaO, in the case where any one of BaO and SrO is contained, more than 0.5% to 1.0% by weight of BaO or 0.2 to 1.0% by weight of SrO, or in the case where both of them are contained, 0.2% by weight or more of SrO and 0.2% to 1.0% by weight in total of SrO and BaO, 0.1 to 0.5% by weight of $SnO_2$, 0.3% by weight or less of $Fe_2O_3$ and $TiO_2$ in total, less than 0.01% by weight of $P_2O_5$, and less than 0.01% by weight of CuO.

Referring to the expression for the weight percentage, for example, "0.1 to 0.5% by weight" means "0.1% by weight or more and 0.5% by weight or less".

The present inventors have closely studied the evaluation method for the formation of the zircon crystals and the composition of the high zirconia electrically fused cast refractory to be used for glass melting furnaces.

As a method of evaluating the formation of the zircon crystals, a method of measuring a residual volume expansion after a heat cycle test of heating the refractory repetitively in a range from 800° C. to 1250° C. and judging the state of forming the zircon crystals depending on the extent of the value has been used so far.

That is, since there is a positive correlation between the residual volume expansion and the amount of forming the zircon crystals, a refractory having a small residual volume expansion after the heat cycle test and less forming the zircon crystals was required.

Figure 1:
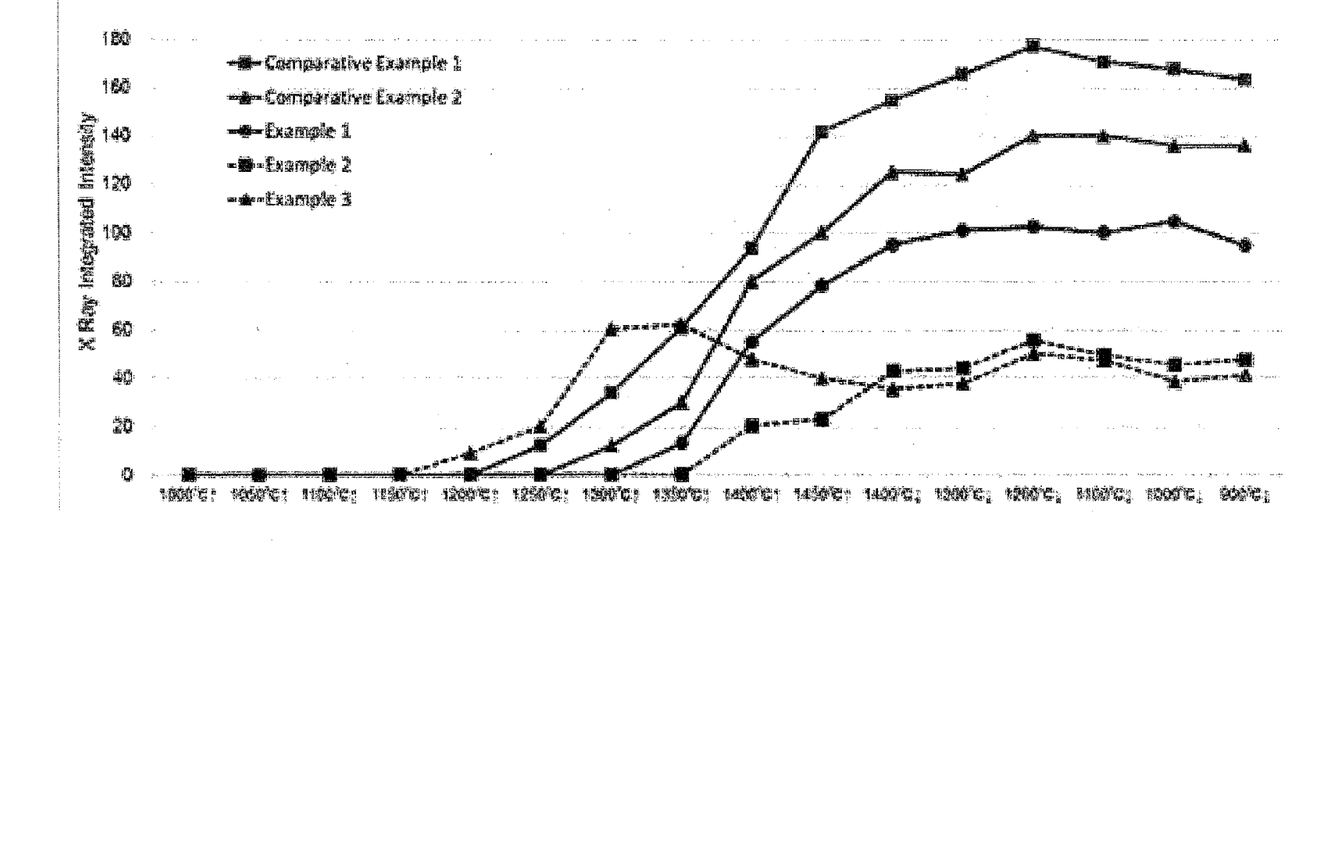
FIG. 1 is a graph illustrating zircon deposition amounts in Examples 1 to 3 and Comparative Examples 1 and 2 by high temperature X-ray diffractiometry.

However, as apparent from the result of high temperature X-ray diffractiometry illustrated in FIG. 1, it has been demonstrated that the formation of the zircon starts from about 1200° C., the zircon increases even when heating up to 1450° C. and that the amount of formed zircon crystals varies depending on the kind and the addition amount of additives.

Then, for evaluating the effect of the additives more exactly, when the temperature condition of the heat cycle test has been reconsidered and the temperature range has been extended so as to set the temperature on the lower region to 600° C. which is a temperature lower than the glass transition point (about 800° C.) of the glass phase of the refractory and set the temperature on the higher region to 1450° C. which is a temperature lower than the dissociation temperature of the zircon crystals (about 1550° C.) where the zircon crystals are growing, respectively, the effect of suppressing the formation of the zircon can be evaluated more exactly even by lesser number of heating cycles.

Since the new measuring method shows considerably larger values for the residual volume expansion than those of the existent method, the effect of suppressing the formation of the zircon crystals can be evaluated more exactly.

Further, in the evaluation under the condition where the refractory is in contact with the molten glass, migration of the components of the glass phase of the refractory and the components of the molten glass is promoted and the zircon crystals formed in the refractory can be evaluated at the condition closer to that of the actual furnace, by performing the heat cycles under the heat treatment condition closer to the condition described above in a state where the refractory is in contact with the glass. Further, the cracks observed in actual furnaces can also be evaluated.

As a result of specifically evaluating the composition of the refractory by adopting the evaluation methods, the present invention has been accomplished in the case of a refractory with extreme low contents of $Na_2O$ and $K_2O$ (less than 0.05% by weight), by defining the composition so as to contain $B_2O_3$ and CaO, contain one or more of BaO and SrO and, further, contain $SnO_2$ for suppressing the formation of the zircon crystals upon heating the refractory in itself and also under the condition in contact with the molten glass.

Particularly, $SnO_2$ provides a remarkable effect of suppressing the formation of the zircon crystals upon heating the refractory in itself and the effect of suppressing the formation of the zircon crystals under the condition where the refractory is in contact with the molten glass without lowering the electric resistance of the refractory at a high temperature and has various excellent properties such as an effect of restricting migration of Na ions and K ions, particularly, Na ions that tend to diffuse in the molten glass, and Ba ions and Sr ions that suppress the formation of the zircon crystals.

As a result, the refractory having the composition within the range of the invention has a high electric resistance, is free of cracks during production and upon temperature rising, remarkably suppresses the formation and the growth of the zircon crystals even upon heating the refractory in itself and by heating under the condition where the refractory is in contact with the molten glass, less causes the generation of cracks and the growing of the cracks during operation and enables long time operation of the glass melting furnace including re-operation.

The $ZrO_2$ content is preferably from 85 to 95% by weight and, preferably, 86 to 95% by weight. If the content of $ZrO_2$ is 85% by weight or less, corrosion resistance against molten glass is deteriorated.

If the $ZrO_2$ content exceeds 95% by weight, since the amount of the glass phase is decreased relatively, cracks tend to occur by the temperature change during production of the product, upon temperature rising, during operation, and upon temperature lowering of the glass melting furnace.

$SiO_2$ is a main component of the glass phase. The $SiO_2$ content is 3.5 to 10.0% by weight and, preferably, 4.0 to 9.5% by weight. If the content is less than 3.5% by weight, this relatively increases the $ZrO_2$ content tending to generate cracks during production and upon temperature change of the melting furnace. If the content exceeds 10.0% by weight, while the electric resistance increases, the $ZrO_2$ content is lowered to deteriorate the corrosion resistance.

$Al_2O_3$ is a component that lowers the melting temperature of the glass phase and has an effect of suppressing the formation of the zircon crystals, at the same time, has an effect of decreasing electric resistance.

If the $Al_2O_3$ content is less than 0.1% by weight, the effect of suppressing the formation of the zircon crystals becomes insufficient. If the content is 1.0% by weight or more, the electric resistance is lowered.

The $Al_2O_3$ content is preferably 0.1 to less than 1.0% by weight, more preferably, 0.1 to less than 0.8% by weight, also further preferably, 0.4 to less than 0.8% by weight.

$B_2O_3$, like $SiO_2$, is a component that forms borosilicate glass in the glass phase of the refractory and it is an essential component having an effect of preventing cracks during production of the high zirconia fused cast refractory and cracks upon temperature rising.

Generally, if the $B_2O_3$ content is more than 0.1% by weight, an effect of preventing the cracks during production can be obtained. In the invention, the effect is enhanced more by the coexistence of $SnO_2$ than in a case where $B_2O_3$ is present alone. On the other hand, $B_2O_3$ has an effect of promoting the formation of the zircon crystals and, particularly, if the content exceeds 1.5% by weight, this is not preferred since the formation of the zircon crystals is promoted abruptly.

Accordingly, the $B_2O_3$ content is preferably 0.1 to 1.5% by weight and, more preferably, 0.2 to 1.0% by weight. It is further preferably 0.3 to 0.8% by weight.

$Na_2O$ and $K_2O$ are components having the effect of remarkably suppressing the formation of the zircon crystals but, on the other hand, $Na_2O$ and $K_2O$ are also components that remarkably lower the electric resistance even a small amount.

Accordingly, for ensuring the electric resistance, $Na_2O$ and $K_2O$ contents are generally restricted to an extremely small range and $B_2O_3$ is contained at a relatively high content to prevent generation of the cracks during production and the cracks upon temperature rising, but they may promote the formation and growth of the zircon crystals upon heating the refractory in itself and under the condition in contact with molten glass.

However, even extremely small range of $Na_2O$ and $K_2O$, when $B_2O_3$ and CaO are contained within the range of the invention, and one or more of SrO and BaO, and $SnO_2$ are contained, formation and growth of the zircon crystals can be suppressed upon heating of the refractory in itself and the formation and growth of the zircon crystals can be suppressed also under the condition in contact with the molten glass.

$Na_2O$ and $K_2O$ may be incorporated each alone or in combination. Further, since $K_2O$ less lowers the electric resistance compared with $Na_2O$ and less diffuses into the molten glass than $Na_2O$ also under the condition in contact with the molten glass, it is preferred that the $K_2O$ content is higher.

The content of $Na_2O$ and $K_2O$ in total is preferably less than 0.05% by weight. If the content is more than 0.05% by weight, the electric resistance lowers abruptly. It is more preferably less than 0.04% by weight and, further preferably, 0.02% by weight or less.

BaO and SrO less lower the electric resistance of the refractory compared with $Na_2O$ and $K_2O$, lower the viscosity of the molten material during melting of blended starting materials as in the case of CaO and form a stable glass phase in the refractory, suppressing the formation and growth of the zircon crystals. But it is not sufficient to suppress the formation and growth of the zircon crystals just containing BaO and SrO.

Within the range of the invention containing $SnO_2$, they have an effect of remarkably suppressing the formation and the growth of the zircon crystals for the refractory in itself and, further, under the condition where the refractory is in contact with the molten glass due to the synergistic effect between $SnO_2$ and BaO and SrO, and they are important components of the invention for solving the first, second, and third subjects described above.

That is, since both of BaO and SrO are not solid-solubilized to the $ZrO_2$ crystals but present in the glass phase, have relatively large ionic radius and less diffuse into the molten glass due to the presence of $SnO_2$ even under the condition where the refractory is in contact with the molten glass, the effect can be long lasting.

In melting of liquid crystal glass, which is a major purpose of the refractory of the invention, however, liquid crystal glass may often have a relatively small BaO content and a large SrO content. Accordingly, under conditions where the refractory is in contact with molten glass, Ba ions are liable to be diffused from the glass phase of the refractory to the molten glass and Sr ions are not liable to be diffused from the glass phase of the refractory to the molten glass.

Therefore, under conditions where the refractory is in contact with molten glass. It is preferred that the content of BaO is larger than the amount thereof capable of suppressing the formation of zircon crystals with the refractory solely and the content of SrO is almost same amount thereof suppressing the formation of zircon crystals with the refractory solely BaO and SrO may be incorporated each alone or in combination. When BaO is 0.05% by weight or more and SrO is 0.01% by weight or more, formation of the zircon crystals in the glass phase of the refractory can be suppressed.

But when the content of at least one of BaO and SrO exceeds 3% by weight, electric resistances is lowered, and the content of $ZrO_2$ may be relatively decreased, whereby the corrosion resistance of the refractory may be deteriorated, and silicate compounds of barium or strontium may be formed to make the glass phase unstable.

Accordingly, in the case where any one of BaO and SrO is contained, it is preferred that the content of BaO is 0.05 to 3.0% by weight or the content of SrO is 0.01 to 3.0% by weight.

More preferably, the content of BaO is 0.05 to 1.5% by weight or the content of SrO is 0.01 to 1.5% by weight.

Further preferably, the content of BaO is 0.05 to 1.0% by weight or the content of SrO is 0.01 to 1.0% by weight.

Particularly preferably, the content of BaO is more than 0.5% by weight to 1.0% by weight or the content of SrO is 0.2 to 1.0% by weight.

And in the case where both of them are contained, it is preferred that the content of SrO is 0.01% by weight or more, and the total content of SrO and BaO is from 0.01 to 3.0% by weight.

More preferably, that the content of SrO is 0.01% by weight or more, and the total content of SrO and BaO is from 0.01 to 1.5% by weight.

Further preferably, that the content of SrO is 0.01% by weight or more, and the total content of SrO and BaO is from 0.01 to 1.0% by weight.

Particularly preferably, that the content of SrO is 0.2% by weight or more, and the total content of SrO and BaO is from 0.2 to 1.0% by weight.

Like BaO and SrO, since CaO lowers the viscosity of the molten material during melting of blended materials and forms a stable glass phase in the refractory to prevent cracks in a one-side heating test, CaO is an essential component in the invention.

Further, if the CaO content is within a predetermined range, it provides an effect of suppressing the formation of the zircon crystals. However, since CaO exceeding 0.2% by weight increases the residual volume expansion of the refractory after the heat cycle test and also lowers the electric resistance, the CaO content is preferably 0.2% by weight or less. Further, since CaO is present as an impurity in the starting $ZrO_2$ material, the starting material should be selected carefully.

The CaO content is preferably 0.01% by weight to 0.2% by weight and, more preferably, 0.01 to 0.15% by weight. Further preferably, 0.01 to 0.10% by weight Like BaO, SrO, and CaO, MgO lowers the viscosity of the molten material upon melting the blended starting materials and forms a stable glass phase in the refractory. However, since MgO lowers the electric resistance of the refractory and promotes the formation and growth of the zircon crystals upon heating the refractory in itself and under the condition where the refractory is in contact with the molten glass even by a relatively small amount of about 0.1% by weight, it is preferred not to incorporate MgO in the invention.

Then, as the zircon crystals are formed and the glass phase of the refractory is decreased, MgO tends to be solid-solubilized in the $ZrO_2$ crystals. Further, when MgO is solid-solubilized in the $ZrO_2$ crystals, the rate of heat expansion is different between a solid-solubilized portion and a not solid-solubilized portion in the $ZrO_2$ crystals. Accordingly, when the refractory undergoes heat cycles in this state, the residual volume expansion of the refractory after the heat cycles may sometimes increase extremely to cause pulverization.

Since MgO is also present as the impurity of the starting $ZrO_2$ material, the starting material should be selected carefully.

The MgO content is preferably 0.1% by weight or less, more preferably, 0.05% by weight or less and, further preferably, 0.01% by weight or less.

$SnO_2$ lowers the viscosity of the glass phase during production of the refractory and forms a stable glass phase. In the invention containing less $Na_2O$ and $K_2O$, $SnO_2$ has an effect of less lowering the electric resistance, an effect of transferring the temperature of forming the zircon crystals to a higher temperature region and suppressing the formation and growth of zircon crystal, an effect of suppressing the migration of Na ions and K ions, particularly, Na ions and, further, Bs ion and Sr ion under the condition where the refractory is in contact with the molten glass. $SnO_2$ has an extremely useful property and is an important component of the invention for solving the first to third subjects described above.

In the case where $SnO_2$ is containing along with at least one of BaO and SrO, the formation and growth of zircon crystals may be considerably suppressed due to the synergistic effect with BaO and SrO.

While the reason of the useful effects of $SnO_2$ described above is not apparent, it may be considered that they are concerned, for example, with that $SnO_2$ may be possibly present as a glass forming oxide, like $SiO_2$ and $B_2O_3$, also may be possibly of reforming of $ZrO_2$ crystal because $SnO_2$ may be solid-solubilized in the $ZrO_2$ crystals, easily releases and intakes oxygen due to change of valence between bivalence and tetravalence under a certain temperature condition, and with the electroconductivity of $SnO_2$.

However, if the $SnO_2$ content is excessive, the refractory is colored and electrical resistance of the refractory is decreased.

Accordingly, the $SnO_2$ content is preferably 0.01 to 0.7% by weight, more preferably 0.04 to 0.5% by weight, further preferably 0.1 to 0.7% by weight, particularly preferably 0.1 to 0.5% by weight.

$P_2O_5$, like $B_2O_3$, has an effect of preventing cracks during production and upon temperature rising.

However, even a small amount of $P_2O_5$ remarkably promotes the formation and the growth of the zircon crystals in the glass phase of the high zirconia fused cast refractory.

Further, $P_2O_5$ has a high hygroscopicity and has a nature that dense refractory is hardly produced when $P_2O_5$ is used in the starting material.

$P_2O_5$ is an impurity contained in the starting $ZrO_2$ material and the content is preferably less than 0.01% by weight.

$Fe_2O_3$ and $TiO_2$ are impurities contained in the starting $ZrO_2$ material.

Since such oxides cause coloration of the molten glass and lowering of the electric resistance of the refractory, the starting materials should be selected carefully. The total content of $Fe_2O_3$ and $TiO_2$ is preferably 0.3% by weight or less and, more preferably, 0.25% by weight or less. Further preferably, the total content of $Fe_2O_3$ and $TiO_2$ is 0.2% by weight or less.

Since CuO is a component of coloring the molten glass even by a small amount, it should be restricted to less than a content that causes coloration. For this purpose, the CuO content is preferably less than 0.01% by weight.

$Y_2O_3$ is present as an impurity in the starting zirconia material and since $Y_2O_3$ promotes the formation of zircon crystals, the residual volume expansion after the heat cycles may be increased, the starting materials should be selected carefully.

If the $Y_2O_3$ content exceeds 0.3% by weight, the residual volume expansion after heating the refractory by several cycles increases to promote the formation of the zircon crystals. Accordingly, the $Y_2O_3$ content is preferably 0.3% by weight or less and, more preferably, 0.2% by weight or less.

As other additive, ZnO also has an effect of suppressing the formation and the growth of the zircon crystals. However, incorporation of ZnO is not preferred since the refractory becomes porous, a dense refractory is difficult to be obtained, and the corrosion resistance as the refractory is deteriorated.

Example

A high zirconia electrically fused cast refractory according to a preferred example of the invention is to be described.

Oxide materials such as $SiO_2$, $Al_2O_3$, $Na_2O$, $B_2O_3$, BaO, SrO, and $SnO_2$, nitrate materials, etc. were blended at each of predetermined ratios on the basis of the oxide to a starting zirconia material obtained by desiliconizing zircon sands. After mixing them, they were melted in an electric arc furnace, cast in a mold, buried together with the mold into an aluminum powder, and gradually cooled to a room temperature.

The mold used in the example was made of graphite and had a product portion sized 100×300×300 mm and a feeder portion having an inner size of 140×235×350 mm connected integrally over the product portion.

After gradual cooling, the cast product was taken out of the alumina powder, the product portion was separated from the feeder portion to obtain a desired high zirconia electrically fused cast refractory.

[Table 1]

Table 1 shows compositions and properties of high zirconia electrically fused cast refractories of Example 1 to Example 17.

[Table 2]

Further, Table 2 shows compositions and properties of high zirconia electrically fused cast refractories of Comparative Example 1 to Comparative Example 12.

The amount for each of the components in Tables 1 and 2 is based on wt %. The components were analyzed by flame photometry for $K_2O$ and $Na_2O$, by atomic absorption spectroscopy for $P_2O_5$, and by ICP for other components. However, the analysis methods are not restricted to them but other analysis methods can also be adopted in the invention.

In the analysis of the invention, 30 mmφ spherical samples were taken by the number of ten upon casting the molten metal, and analytical values obtained by pulverizing the samples were used as analytical values for the high zirconia electrically fused cast refractory.

At first, high temperature X-ray diffractiometry was performed for Examples 1 to 3 and Comparative Examples 1 and 2 for demonstrating the effect of BaO, SrO, and $SnO_2$ as the important components of the invention on the formation of the zircon crystals. The compositions are shown in Table 1 and Table 2 and the result of the high temperature X-ray diffractiometry is shown in FIG. 1.

The trend of forming the zircon crystals by the high temperature X-ray diffractiometry was evaluated as described below.

At first, a powder of the high zirconia electrically fused cast refractory pulverized to a size of several microns was set to an alumina holder of an X-ray diffraction apparatus (XRD-6000: manufactured by Shimadzu Corporation) provided with a sample heating attachment (HA-1001: manufactured by Shimadzu Corporation). Then, after rising the temperature to 1450° C. at a temperature elevation rate of 20° C./rain, the temperature was lowered to 600° C. at a temperature lowering rate of 20° C./min. X-ray diffractiometry was performed during temperature rising, while keeping the sample for one minute on every 50° C. from 1000° C. and a diffraction peak intensity of zircon was measured. In the same manner, X-ray diffractiometry was performed during temperature lowering while keeping the sample for one minute on every 100° C. from 1400° C. to 600° C. In order to evaluate the state of forming the zircon crystals, an integrated value for the highest peak of the zircon crystals was calculated as a peak area and the numerical value was defined as the evaluation value for the amount of formed zircon.

Comparative Example 1 provides a composition not containing BaO, SrO and $SnO_2$. Zircon crystals started to be formed at 1250° C. and the amount of formation increased along with temperature rising and continued to increase also upon temperature lowering after rising the temperature to 1450° C. The integrated intensity of the zircon crystals at 1400° C. upon temperature lowering was 154.

Comparative Example 2 is an example with addition of BaO. The temperature forming the zircon crystals in Comparative Example 2 was 1300° C. and the integrated intensity of the zircon crystals at 1400° C. upon temperature lowering was 125.

Example 1 is an example with addition of BaO and $SnO_2$. The temperature forming the zircon crystals increased to 1350° C., and the integrated intensity of zircon at 1400° C. upon temperature lowering was 95, which was decreased to about 60% of Comparative Example 1.

Example 2 is an example in which the contents of BaO and $SnO_2$ were increased. The temperature forming the zircon crystals increased to 1400° C. and the integrated intensity of zircon at 1400° C. upon temperature lowering was 43, which was lowered to about 30% of Comparative Example 1.

Example 3 is an example in which SrO and $SnO_2$ were added. The temperature forming the zircon crystals lowered to 1150° C., and the amount of zircon formed showed the maximum value at 1350° C.

The integrated intensity of the zircon at 1400° C. upon temperature lowering was 35, which was decreased to about 25% of Comparative Example 1, As described above, formation and growth of the zircon crystals could be suppressed remarkably by the coexistence of BaO, SrO, and $SnO_2$.

For the cracks during production, the state of products after digging up was observed and the presence or absence of cracks was evaluated in a state not yet subjected to surface finishing. Refractory with no cracks was judged as "none", refractory with cracks up to 2 mm width and 50 mm length was judged as "minute", and refractory with larger cracks was judged as "cracked".

The heat cycle test 1 is according to an existent evaluation method.

A sample sized 50×50×100 mm was separated from the product sized 100×300×300 mm on the side of the bottom (surface opposite to the surface from which the feeder portion was separated) and the cast surface was cut each by 25 mm to obtain an evaluation sample sized 50×50×50 mm. The samples were heated to 800° C. at a temperature elevation rate of 3° C./min and kept for one hour. Then, they were heated up to 1250° C. at a temperature elevation rate of 3° C./rain and kept at 1250° C. for one hour. After keeping for one hour, they were cooled down to 800° C. at a temperature lowering rate of 3° C./min and kept for one hour. Heat cycles were repeated for 20 cycles, assuming a process of keeping at 800° C. for one hour and keeping at 1250° C. for one hour being as one cycle. Based on the sizes before and after heating in the heat cycle test, a residual volume expansion after the test was calculated and the cracks and the state of pulverization of the refractory after the heat cycle test were confirmed. Then, refractory with no cracks was judged as "none". when there were cracks, they were judged as "minute" for the crack of 0.2 mm or less of width, judged as "cracked" for the width of 0.3 mm or more. When there was pulverized, it was judged as "pulverized".

The residual volume expansion in the heat cycle test 1 is preferably 5% or less and, more preferably, 4% or less.

A heat cycle test 2 is a novel measuring method.

In view of the result of the high temperature X-ray diffractiometry, this is a method of performing the heat cycles within the range of a temperature from 600° C. which is the glass transition point of the glass phase in the refractory or lower on a low temperature region to a temperature of 1450° C. where the zircon crystals continue to be formed on a high temperature region. For the sample in the heat cycle test 2, a sample having an identical size was obtained from the side of the bottom in the same manner as in the heat cycle test 1. The sample was heated to 600° C. at a temperature elevation rate of 3° C./rain and kept for one hour. Then, the sample was heated up to 1450° C. at a temperature elevation rate of 3° C./min and kept at 1450° C. for one hour. After keeping for one hour, the sample was cooled to 600° C. at a temperature lowering rate of 3° C./min and kept for one hour, Heat cycles were repeated for 20 cycles assuming a process of keeping at 600° C. for one hour and keeping at 1450° C. for one hour being as one cycle. After repeating 20 heat cycles, the sizes before and after the heating were measured to calculate the residual volume expansion and cracks and pulverized state of the refractory after the cycle test were confirmed.

Since the residual volume expansion in the heat cycle test 2 showed a considerably larger value than that of the result of the heat cycle test 1 as the existent method, trend of forming the zircon could be judged easily in a shorter time.

The residual volume expansion in the heat cycle test 2 is preferably 10% or less and, more preferably, 7% or less, further preferably, 5% or less.

A heat cycle test 3 is a new test method that evaluates the reactivity under the condition where the refractory is in contact with molten glass.

A square sample sized 100×100×100 mm was separated from the corner part on the side of the bottom of a product sized 100×300×300 mm, a central part at the surface opposite to the bottom thereof was drilled to a depth of 70 mm by a drill bit of 50 mm diameter, a drilled core was cut out to manufacture a crucible of a high zirconia electrically fused cast refractory. Further, for removing the effect of the metal component caused by the drilling fabrication, the crucible was washed with an acid and further with ion exchanged water and then dried. Liquid crystal glass pulverized to about 1 to 3 mm was filled by about 230 g into the refractory crucible. The crucible was heated to 800° C. at a temperature elevation rate of 3° C./min and kept for 3 hours. Then, the crucible was heated up to 1450° C. at the same temperature elevation rate and kept for 3 hours. Subsequently, the temperature was lowered to 800° C. at a temperature lowering rate of 3° C./min. Then, the crucible was heated repetitively for 10 cycles assuming a process of heating at 800° C. for three hours and heating at 1450° C. for 3 hours being as one cycle. After the heating, the residual volume expansion of the refractory crucible was measured. Further, cracks and the pulverization state of the refractory after the heat cycle test 3 were confirmed.

And also, refractory crucible was out into half, the strength of the structure of refractory was also confirmed.

The residual volume expansion after the heat cycle test 3 is preferably 15% or less and, more preferably, 10% or less, further preferably 5% or less.

In a one-side heating test, a product sized 100×300×300 mm was set to an electric furnace such that one surface of 300×300 mm was in contact with the inside of the furnace and the opposite surface thereof was in contact with the outside of the furnace. The sample was heated up to 1000° C. at a temperature elevation rate of 100° C./hr and the absence or presence for the occurrence of cracks upon temperature rising was measured.

The electric resistance was measured according to the four terminal method of JIS R 1661 and JIS R 1650-2. Each of the drilled core of 19 mm diameter and 100 mm length was sampled at the position 50 mm from each of the upper part and the lateral part at the corner in the upper part of the product sized 100×300×300 mm (surface from which the feeder part was separated). The core was cut out by 5 mm from the mold surface to prepare a sample of 30 mm entire length including the cut surface. After slotting the surface at a position of 5 mm from both ends of the entire 30 mm length, the sample was subjected to the supersonic cleaning and dried by a drier. After the drying, a platinum paste was coated uniformly to the slotted part and both ends and heated at 1000° C. for one hour. After cooling, platinum plates were provided on both ends of the sample, a platinum wire was wound around the slotted part to form terminals and connected to an LCR meter (Chemical Impedance Meter, Model 3532-80, manufactured by Hioki E.E. Corporation). A voltage at 4 V was applied to the sample and an impedance was determined based on the value of a current flowing in the sample. An electric resistance (Ω·cm) was calculated based on the impedance value, the sample length, the sample cross sectional area, and the slot pitch.

In the measurement, the sample was heated to 1650° C. at a temperature elevation rate of 4° C./min and kept for 12 hours. It was confirmed that the electric resistance after keeping for 12 hours showed a stable value and an electric resistance after keeping for 12 hours was measured as an electric resistance at 1650° C. and, further, the temperature was lowered at a temperature lowering rate of 4° C./min and an electric resistance was measured when the temperature was lowered to 1500° C.

The electric resistance of refractory at 1500° C. is preferably 150 Ω·cm or higher, more preferably, 200 Ω·cm or higher, further preferably 300 Ω·cm or higher.

The electric resistance of refractory at 1650° C. is preferably 90 Ω·cm or higher, more preferably, 150 Ω·cm or higher, further preferably 200 Ω·cm or higher.

The liquid crystal glass used in the test was a non-alkali glass comprising 60% by weight of $SiO_2$, 15% by weight of $Al_2O_3$, 7% by weight of CaO, 7% by weight of SrO, 7% by weight of $B_2O_3$, 1% by weight of MgO, and 3% by weight of BaO.

Examples 1 to 17 in Table 1 are within the range of the invention. There were no cracks during production and upon temperature rising, the residual volume expansion after the heat cycle tests 1 and 2 was also small, and no cracks were generated. Further, the electric resistance at high temperature also showed a high value. In the heat cycle test 3, the residual volume expansion was small and, while cracks were generated, the strength of the outer surface and inner part of sample was maintained, not pulverized and the formation of the zircon crystals could be suppressed even under the condition where the refractory is in contact with the molten glass.

Table 2 shows the Comparative Examples 1 to 12 which are out of the range of the invention.

Comparative Example 1 is an example not containing BaO, SrO, $SnO_2$, and $Na_2O$. While the electric resistance was high, crack was generated at heat cycle test 1 and the residual volume expansion was large and the sample was pulverized remarkably in the heat cycle tests 2 and 3.

Comparative Example 2 is an example containing BaO but not containing SrO and $SnO_2$, which corresponds to JP-A 2008-7358. While the electric resistance was high, the refractory was pulverized in the heats cycle test 2 and 3.

Comparative Example 3 does not contain $Na_2O$, CuO, MgO, and $SnO_2$ and containing $B_2O_3$, BaO and SrO which is an example corresponding to JP-A S63-285173. While the electric resistance was high, the refractory was pulverized in the heat cycle tests 2 and 3 and cracks were generated in the one-side heating test.

Comparative Example 4 is an example having a high CaO content. The electric resistance was low, cracks were generated in the refractory in the heat cycle tests 1 and 3, and the refractory was pulverized in the heat cycle test 2.

Comparative Example 5 is an example having high content of $Na_2O$, MgO, and containing $P_2O_5$.

The refractory was pulverized in the heat cycle tests 1, 2, and 3.

Comparative Example 6 is an example having low contents of $SiO_2$, $Al_2O_3$, and high $ZrO_2$ content.

The electric resistance was low and the refractory was pulverized in the heat cycle tests 1, 2, and 3. Further, cracks were generated in the one-side heating test.

Comparative Example 7 is an example having high contents of $SiO_2$, MgO, the total amount of $Na_2O$ and $K_2O$, BaO, and $B_2O_3$, and low $ZrO_2$ content. The electric resistance is low and cracks were generated in the heat cycle test 1, the refractory was pulverized in the heat cycle tests 2 and 3.

Comparative Example 8 is an example having a low $B_2O_3$ content and a high $SnO_2$, $Y_2O_3$ content.

The refractory was deformed and colored upon digging of the product. Cracks were generated in the heat cycle tests 1 and 3 and the refractory was pulverized in the heat cycle test 2. The electric resistance was low.

Comparative Example 9 is an example containing $Na_2O$, BaO, $P_2O_5$, and $SnO_2$ having a composition corresponding to that of JP-A H09(1997)-2870. Cracks were generated in the heat cycle test 1 and the refractory was pulverized in the heat cycle tests 2 and 3. The electric resistance was low.

Comparative Example 10 is an example in which the contents of $Al_2O_3$, the total content of $Fe_2O_3$ and $TiO_2$ and CuO were large. The refractory was colored during production. Minute cracks were generated in the heat cycle test 1 and the refractory was pulverized in the heat cycle tests 2 and 3. Further, electric resistance was low.

Comparative Example 11 comprises a composition having a high content of $Al_2O_3$, and containing BaO and SrO and CaO, and not containing $Na_2O$, $K_2O$, and $SnO_2$. This is a composition corresponding to that of JP-A H04-193766.

Minute cracks were generated in the heat cycle test 1 and the refractory was pulverized in the heat cycle tests 2 and 3.

Comparative Example 12 is an example not containing $K_2O$, BaO, SrO and $SnO_2$, which is a composition corresponding to that of WO2005/068393 A1.

Cracks were generated in the heat cycle test 1, and the refractory was pulverized in the heat cycle tests 2 and 3.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Component (wt %) | $ZrO_2$ | 92.3 | 91.9 | 91.9 | 92.2 | 89.5 | 94.5 | 85.4 | 89.4 | 87.0 |
| | $SiO_2$ | 5.30 | 5.20 | 5.23 | 5.35 | 8.25 | 3.90 | 9.65 | 8.30 | 8.88 |
| | $Al_2O_3$ | 0.62 | 0.81 | 0.81 | 0.25 | 0.55 | 0.16 | 0.20 | 0.46 | 0.95 |
| | $Na_2O$ | <0.01 | <0.01 | <0.01 | <0.01 | 0.03 | 0.01 | <0.01 | <0.01 | <0.01 |
| | $K_2O$ | 0.03 | 0.03 | 0.03 | 0.02 | 0.01 | <0.01 | 0.01 | <0.01 | 0.01 |
| | $B_2O_3$ | 0.46 | 0.47 | 0.47 | 0.45 | 0.65 | 0.35 | 0.15 | 0.55 | 1.35 |
| | BaO | 0.53 | 0.86 | <0.01 | 0.83 | 0.08 | 0.34 | 2.85 | 0.52 | <0.01 |
| | SrO | <0.01 | <0.01 | 0.65 | <0.01 | <0.01 | <0.01 | <0.01 | <0.01 | 0.35 |
| | CaO | 0.08 | 0.06 | 0.08 | 0.10 | 0.10 | 0.02 | 0.02 | 0.05 | 0.18 |
| | MgO | <0.01 | <0.01 | <0.01 | <0.01 | 0.03 | <0.01 | <0.01 | 0.01 | 0.04 |
| | $SnO_2$ | 0.09 | 0.12 | 0.09 | 0.20 | 0.25 | 0.31 | 0.21 | 0.13 | 0.65 |
| | $Fe_2O_3$ | 0.25 | 0.25 | 0.25 | 0.25 | 0.18 | 0.20 | 0.25 | 0.25 | 0.18 |
| | CuO | <0.01 | <0.01 | <0.01 | <0.01 | <0.01 | <0.01 | <0.01 | <0.01 | <0.01 |
| | $P_2O_5$ | <0.01 | <0.01 | <0.01 | <0.01 | <0.01 | <0.01 | <0.01 | <0.01 | <0.01 |
| | $Y_2O_3$ | 0.16 | 0.19 | 0.19 | 0.17 | 0.17 | 0.12 | 0.18 | 0.16 | 0.24 |
| Cracks during production | | none | none | none | none | none | none | none | none | none colored |
| Heat cycle test 1 | Cracks, pulverization | none | none | none | none | none | none | none | none | none |
| | Residual volume expansion(%) | 4.0 | 3.1 | 3.5 | 1.7 | 1.1 | 3.7 | 1.5 | 3.1 | 4.5 |
| Heat cycle test 2 | Cracks, pulverization | none | none | none | none | none | none | none | none | none |
| | Residual volume expansion(%) | 7.4 | 6.5 | 8.9 | 2.5 | 2.0 | 8.4 | 2.5 | 3.0 | 9.4 |
| Heat cycle test 3 | Cracks, pulverization | cracked | cracked | cracked | none | none | cracked | none | none | cracked |
| | Residual volume expansion(%) | 8.6 | 14.4 | 8.5 | 2.4 | 2.4 | 10.2 | 2.5 | 2.4 | 12.5 |
| Electric resistance | 1650° C. (Ωcm) | 125 | 90 | 96 | 95 | 291 | 91 | 115 | 260 | 94 |
| | 1500° C. (Ωcm) | 221 | 170 | 205 | 193 | 595 | 175 | 245 | 620 | 200 |
| One side heating test | Cracks | none | none | none | none | none | none | none | none | none |

| | | Example 10 | Example 11 | Example 12 | Example 13 | Example 14 | Example 15 | Example 16 | Example 17 |
|---|---|---|---|---|---|---|---|---|---|
| Component (wt %) | $ZrO_2$ | 92.9 | 87.1 | 90.7 | 92.3 | 88.8 | 90.8 | 86.5 | 85.9 |
| | $SiO_2$ | 5.00 | 9.75 | 6.60 | 5.82 | 8.21 | 6.78 | 9.95 | 9.63 |
| | $Al_2O_3$ | 0.45 | 0.25 | 0.65 | 0.62 | 0.45 | 0.85 | 0.45 | 0.45 |
| | $Na_2O$ | <0.01 | <0.01 | 0.01 | <0.01 | <0.01 | 0.01 | <0.01 | <0.01 |
| | $K_2O$ | 0.01 | <0.01 | 0.01 | 0.01 | 0.01 | 0.01 | <0.01 | 0.03 |
| | $B_2O_3$ | 0.36 | 0.85 | 0.45 | 0.47 | 0.15 | 0.45 | 0.60 | 0.18 |
| | BaO | 0.24 | 1.25 | 0.51 | <0.01 | 0.20 | 0.52 | <0.01 | <0.01 |
| | SrO | 0.10 | <0.01 | 0.45 | 0.04 | 1.25 | <0.01 | 1.45 | 2.75 |
| | CaO | 0.03 | 0.15 | 0.05 | 0.05 | 0.13 | 0.05 | 0.15 | 0.02 |
| | MgO | 0.01 | 0.07 | 0.01 | <0.01 | <0.01 | 0.01 | 0.07 | <0.01 |
| | $SnO_2$ | 0.25 | 0.04 | 0.04 | 0.10 | 0.21 | 0.15 | 0.04 | 0.03 |
| | $Fe_2O_3$ | 0.27 | 0.28 | 0.26 | 0.15 | 0.25 | 0.26 | 0.28 | 0.25 |
| | CuO | <0.01 | <0.01 | <0.01 | <0.01 | <0.01 | <0.01 | <0.01 | <0.01 |
| | $P_2O_5$ | <0.01 | <0.01 | <0.01 | <0.01 | <0.01 | <0.01 | <0.01 | <0.01 |
| | $Y_2O_3$ | 0.16 | 0.12 | 0.13 | 0.16 | 0.18 | 0.13 | 0.12 | 0.18 |
| Cracks during production | | none | none | none | none | none | none | none | none |
| Heat cycle test 1 | Cracks, pulvarization | none | none | none | none | none | none | none | none |
| | Residual volume expansion(%) | 3.2 | 3.7 | 3.9 | 4.2 | 2.5 | 2.5 | 5.2 | 2.6 |
| Heat cycle test 2 | Cracks, pulvarization | none | none | none | none | none | none | none | none |
| | Residual volume expansion(%) | 7.3 | 4.5 | 9.5 | 8.8 | 5.8 | 3.1 | 8.5 | 2.5 |
| Heat cycle test 3 | Cracks, pulvarization | cracked | mimuete | cracked | cracked | none | mimuete | cracked | none |
| | Residual volume expansion(%) | 9.8 | 5.0 | 9.6 | 9.5 | 3.3 | 4.0 | 12.6 | 2.8 |
| Electrical resistance | 1650° C. (Ωcm) | 153 | 170 | 125 | 180 | 115 | 170 | 90 | 75 |
| | 1500° C. (Ωm) | 300 | 380 | 255 | 380 | 223 | 365 | 160 | 153 |
| One side heating test | Cracks | none | none | none | none | none | none | none | none |

TABLE 2

| | | Comparative 1 | Comparative 2 | Comparative 3 | Comparative 4 | Comparative 5 | Comparative 6 | Comparative 7 |
|---|---|---|---|---|---|---|---|---|
| Component (wt %) | $ZrO_2$ | 93.4 | 92.5 | 92.1 | 90.8 | 88.7 | 95.5 | 83.5 |
| | $SiO_2$ | 4.90 | 5.31 | 6.15 | 5.13 | 7.93 | 3.26 | 10.15 |
| | $Al_2O_3$ | 0.56 | 0.56 | 0.10 | 0.73 | 0.97 | 0.05 | 0.57 |
| | $Na_2O$ | <0.01 | <0.01 | <0.01 | <0.01 | 0.07 | <0.01 | 0.01 |
| | $K_2O$ | 0.03 | 0.03 | <0.01 | 0.04 | <0.01 | <0.01 | 0.05 |
| | $B_2O_3$ | 0.47 | 0.47 | 0.65 | 0.45 | 0.68 | 0.38 | 1.55 |
| | BaO | <0.01 | 0.45 | 0.26 | 1.55 | 0.61 | <0.01 | 3.12 |
| | SrO | <0.01 | <0.01 | 0.25 | 0.25 | <0.01 | 0.05 | <0.01 |
| | CaO | 0.06 | 0.07 | <0.01 | 0.27 | 0.10 | 0.12 | 0.18 |
| | MgO | <0.01 | 0.01 | <0.01 | <0.01 | 0.13 | <0.01 | 0.15 |
| | $SnO_2$ | <0.01 | <0.01 | <0.01 | 0.21 | 0.12 | 0.06 | 0.05 |
| | $Fe_2O_3$ | 0.25 | 0.25 | 0.20 | 0.25 | 0.25 | 0.27 | 0.30 |
| | CuO | <0.01 | <0.01 | <0.01 | <0.01 | <0.01 | 0.01 | <0.01 |
| | $P_2O_5$ | <0.01 | <0.01 | <0.01 | <0.01 | 0.07 | <0.01 | 0.01 |
| | $Y_2O_3$ | 0.18 | 0.18 | 0.14 | 0.17 | 0.18 | 0.18 | 0.25 |
| Cracks during production | | none | none | none | none | none | none | none |
| Heat cycle test 1 | Cracks, pulverization | cracked | none | none | cracked | pulverized | pulverized | cracked |
| | Residual volume expansion(%) | 12.8 | 7.1 | 9.2 | 20.0 | 25.0 | 32.4 | 14.5 |
| Heat cycle test 2 | Cracks, pulverization | pulverized | pulverized | pulverized | pulverized | pulverized | pulverized | pulverized |
| | Residual volume expansion(%) | 46.9 | 25.1 | 23.0 | 33.3 | 48.0 | 47.6 | 45.2 |
| Heat cycle test 3 | Cracks, pulverization | pulverized | pulverized | pulverized | cracked | pulverized | pulverized | pulverized |
| | Residual volume expansion(%) | 30.8 | 23.2 | 35.0 | 16.7 | 30.0 | 32.5 | 30.6 |
| Electric resistance | 1650° C. (Ωcm) | 109 | 98 | 163 | 35 | 120 | 55 | 44 |
| | 1500° C. (Ωcm) | 224 | 212 | 348 | 78 | 270 | 125 | 100 |
| One side heating test | Cracks | none | none | cracked | none | none | cracked | none |

| | | Comparative 8 | Comparative 9 | Comparative 10 | Comparative 11 | Comparative 12 |
|---|---|---|---|---|---|---|
| Component (wt %) | $ZrO_2$ | 92.1 | 92.0 | 90.8 | 91.5 | 91.9 |
| | $SiO_2$ | 4.12 | 4.80 | 5.00 | 4.61 | 5.77 |
| | $Al_2O_3$ | 0.60 | 1.20 | 1.30 | 1.05 | 0.95 |
| | $Na_2O$ | 0.04 | 0.25 | <0.01 | <0.01 | 0.02 |
| | $K_2O$ | <0.01 | 0.05 | 0.01 | <0.01 | <0.01 |
| | $B_2O_3$ | 0.05 | 0.21 | 0.39 | 0.45 | 0.58 |
| | BaO | 0.50 | 0.35 | <0.01 | 1.00 | <0.01 |
| | SrO | <0.01 | <0.01 | 1.59 | 0.55 | <0.01 |
| | $C_2O$ | 0.10 | 0.06 | 0.07 | 0.25 | 0.22 |
| | MgO | <0.01 | 0.01 | 0.07 | 0.01 | 0.02 |
| | $SnO_2$ | 0.75 | 0.10 | 0.04 | <0.01 | <0.01 |
| | $Fe_2O_3$ | 0.25 | 0.25 | 0.35 | 0.25 | 0.20 |
| | CuO | <0.01 | 0.02 | 0.03 | 0.01 | <0.01 |
| | $P_2O_5$ | <0.01 | 0.30 | <0.01 | <0.01 | <0.01 |
| | $Y_2O_3$ | 0.38 | 0.25 | 0.18 | 0.16 | 0.17 |
| Cracks during production | | Deformed colored | none | none | colored | none |
| Heat cycle test 1 | Cracks, pulverization | cracked | cracked | mimuete | mimuete | cracked |
| | Residual volume expansion(%) | 15.0 | 15.3 | 11.0 | 11.5 | 12.5 |
| Heat cycle test 2 | Cracks, pulverization | pulverized | pulverized | pulverized | pulverized | pulverized |
| | Residual volume expansion(%) | 27.5 | 24.6 | 55.0 | 34.5 | 53.1 |
| Heat cycle test 3 | Cracks, pulverization | cracked | pulverized | pulverized | pulverized | pulverized |
| | Residual volume expansion(%) | 19.0 | 25.0 | 45.0 | 25.0 | 26.1 |
| Electric resistance | 1650° C. (Ωcm) | 45 | 52 | 24 | 50 | 85 |
| | 1500° C. (Ωcm) | 95 | 110 | 45 | 103 | 175 |
| One side heating test | Cracks | none | none | none | none | none |

The invention claimed is:

1. A high zirconia electrically fused cast refractory with higher electric resistance at high temperature and zircon crystals are less formed even upon heating a refractory in itself or heating under the condition where the refractory is in contact with a molten glass, comprising, as chemical components:
   85 to 95% by weight of $ZrO_2$
   0.1 to less than 1.0% by weight of $Al_2O_3$,
   3.5 to 10.0% by weight of $SiO_2$,
   less than 0.05% by weight of $Na_2O$ and $K_2O$ in total,
   0.1 to 1.5% by weight of $B_2O_3$,
   0.1% by weight or less of MgO,
   0.01 to 0.2% by weight of CaO,
   in the case where any one of SrO and BaO is contained,
     0.05 to 3.0% by weight of BaO or 0.01 to 3.0% by weight of SrO, or in the case where both of them are contained, 0.01% by weight or more of SrO and 0.01 to 3.0% by weight of SrO and BaO in total,
   0.01 to 0.7% by weight of $SnO_2$,
   0.3% by weight or less of $Fe_2O_3$ and $TiO_2$ in total,
   less than 0.01% by weight of $P_2O_5$, and
   less than 0.01% by weight of CuO.

2. The high zirconia electrically fused cast refractory according to claim 1, comprising, as chemical components:
   in the case where any one of SrO and BaO is contained,
     0.05 to 1.5% by weight of BaO or 0.01 to 1.5% by weight of SrO, or in the case where both of them are contained, 0.01% by weight or more of SrO and 0.01 to 1.5% by weight of SrO and BaO in total.

3. The high zirconia electrically fused cast refractory according to claim 1, comprising, as chemical components:

4.0 to 9.5% by weight of $SiO_2$,
less than 0.04% by weight of $Na_2O$ and $K_2O$ in total,
0.2 to 1.0% by weight of $B_2O_3$,
0.01 to 0.15% by weight of CaO,
in the case where any one of SrO and BaO is contained, 0.05 to 1.0% by weight of BaO or 0.01 to 1.0% by weight of SrO, or in the case where both of them are contained, 0.01% by weight or more of SrO and 0.01 to 1.0% by weight of SrO and BaO in total,
0.1 to 0.5% by weight of $SnO_2$.

4. The high zirconia electrically fused cast refractory according to claim 1, comprising, as chemical components:
4.0 to 9.5% by weight of $SiO_2$,
less than 0.04% by weight of $Na_2O$ and $K_2O$ in total,
0.2 to 1.0% by weight of $B_2O_3$,
0.01 to 0.15% by weight of CaO,
in the case where any one of SrO and BaO is contained, 0.5 to 1.0% by weight of BaO or 0.2 to 1.0% by weight of SrO, or in the case where both of them are contained, 0.2% by weight or more of SrO and 0.2 to 1.0% by weight of SrO and BaO in total,
0.1 to 0.5% by weight of $SnO_2$.

5. The high zirconia electrically fused cast refractory according to claim 1, wherein a residual volume expansion after repetitive heating for 20 cycles is 10% or less assuming a process of rising the temperature up to 1450° C. after keeping at 600° C. for one hour and then keeping at 1450° C. for one hour being as one cycle.

6. The high zirconia electrically fused cast refractory according to claim 1, wherein a residual volume expansion is 15% or less after filling liquid crystal glass in a crucible made of a high zirconia electrically fused and cast refractory, and applying repetitive heating for 10 cycles assuming a process of rising the temperature up to 1450° C. after keeping at 800° C. for 3 hours and then keeping at 1450° C. for 3 hours being as one cycle.

7. The high zirconia electrically fused cast refractory according to claim 1, wherein a residual volume expansion is 10% or less after filling liquid crystal glass in a crucible made of a high zirconia electrically fused and cast refractory, and applying repetitive heating for 10 cycles assuming a process of rising the temperature up to 1450° C. after keeping at 800° C. for 3 hours and then keeping at 1450° C. for 3 hours being as one cycle.

8. The high zirconia electrically fused cast refractory according to claim 1, wherein an electric resistance at 1500° C. is 150 Ω·cm or higher.

9. The high zirconia electrically fused cast refractory according to claim 1, wherein an electric resistance at 1500° C. is 200 Ω·cm or higher.

10. The high zirconia electrically fused cast refractory according to claim 1, wherein, an electric resistance after heating at 1650° C. for 12 hours is 90 Ω·cm or higher.

11. The high zirconia electrically fused cast refractory according to claim 1, wherein an electric resistance after heating at 1650° C. for 12 hours is 150 Ω·cm or higher.

12. The high zirconia electrically fused cast refractory according to claim 1 with 150 Ω·cm or higher at 1500° C. and 10% or less of residual volume expansion upon heating a refractory in itself or 15% or less of residual volume expansion upon heating under the condition where the refractory is in contact with a molten glass, comprising, as chemical components:
0.1 to less than 0.8% by weight of $Al_2O_3$,
0.1 to 0.7% by weight of $SnO_2$.

13. The high zirconia electrically fused cast refractory according to claim 1, which is used for a glass melting furnace.

* * * * *